(12) United States Patent
Kolessar

(10) Patent No.: US 8,572,640 B2
(45) Date of Patent: Oct. 29, 2013

(54) MEDIA DATA USE MEASUREMENT WITH REMOTE DECODING/PATTERN MATCHING

(75) Inventor: Ronald S. Kolessar, Elkridge, MD (US)

(73) Assignee: Arbitron Inc., Columbia, MD (US)

( * ) Notice: Subject to any disclaimer, the term of this patent is extended or adjusted under 35 U.S.C. 154(b) by 2714 days.

(21) Appl. No.: 09/896,246

(22) Filed: Jun. 29, 2001

(65) Prior Publication Data

US 2003/0005430 A1   Jan. 2, 2003

(51) Int. Cl.
   *H04H 60/32*   (2008.01)
(52) U.S. Cl.
   USPC ................ 725/20; 725/9; 725/19; 725/22
(58) Field of Classification Search
   USPC .................................... 725/9–20, 22
   See application file for complete search history.

(56) References Cited

U.S. PATENT DOCUMENTS

| | | | |
|---|---|---|---|
| 3,919,479 A | 11/1975 | Moon et al. | |
| 4,025,851 A | 5/1977 | Haselwood et al. | |
| 4,230,990 A | 10/1980 | Lert, Jr. et al. | |
| 4,697,209 A | 9/1987 | Kiewit et al. | |
| 4,739,398 A | 4/1988 | Thomas et al. | |
| 4,843,562 A | 6/1989 | Kenyon et al. | |
| 4,918,730 A | 4/1990 | Schulze | |
| 4,945,412 A | 7/1990 | Kramer | |
| 4,955,070 A | 9/1990 | Welsh et al. | |
| 5,023,929 A | 6/1991 | Call | |
| 5,319,735 A | 6/1994 | Preuss et al. | |
| 5,425,100 A | 6/1995 | Thomas et al. | |
| 5,450,490 A | 9/1995 | Jensen et al. | |
| 5,481,294 A | 1/1996 | Thomas et al. | |
| 5,483,276 A | 1/1996 | Brooks et al. | |
| 5,512,933 A | 4/1996 | Wheatley et al. | |
| 5,526,427 A | 6/1996 | Thomas et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,583,962 A | 12/1996 | Davis et al. | |
| 5,612,729 A | 3/1997 | Ellis et al. | |
| 5,737,025 A | 4/1998 | Dougherty et al. | |
| 5,737,026 A | 4/1998 | Lu et al. | |
| 5,764,763 A | 6/1998 | Jensen et al. | |
| 5,774,452 A | 6/1998 | Wolosewicz | |
| 5,787,334 A | 7/1998 | Fardeau et al. | |
| 5,822,360 A | 10/1998 | Lee et al. | |
| 5,828,325 A | 10/1998 | Wolosewicz et al. | |
| 5,850,249 A | 12/1998 | Massetti et al. | |
| 5,872,588 A | 2/1999 | Aras et al. | |
| 5,901,178 A | 5/1999 | Lee et al. | |

(Continued)

FOREIGN PATENT DOCUMENTS

| | | |
|---|---|---|
| CN | 1149366 A | 5/1997 |
| JP | 8-508617 | 9/1996 |

(Continued)

*Primary Examiner* — Pankaj Kumar
*Assistant Examiner* — Timothy Newlin
(74) *Attorney, Agent, or Firm* — Barnes & Thornburg LLP

(57) ABSTRACT

Systems and methods are provided for identifying and/or measuring usage of media data gathered at a user location using remote decoding and/or pattern matching techniques. A data set is formed based on the media data, which includes some, but not all, of the information represented by the media data. The data set is communicated to a remotely located processing system for detecting a code based on the data set and/or conducting a pattern matching process based on the data set.

142 Claims, 4 Drawing Sheets

(56) References Cited

U.S. PATENT DOCUMENTS

| | | |
|---|---|---|
| 5,937,000 A | 8/1999 | Lee et al. |
| 5,940,135 A | 8/1999 | Petrovic et al. |
| 5,940,429 A | 8/1999 | Lam et al. |
| 5,945,932 A | 8/1999 | Smith et al. |
| 6,005,501 A | 12/1999 | Wolosewicz |
| 6,035,177 A | 3/2000 | Moses et al. |
| 6,122,403 A | 9/2000 | Rhoads |
| 6,154,484 A | 11/2000 | Lee et al. |
| 6,175,627 B1 | 1/2001 | Petrovic et al. |
| 6,198,832 B1 | 3/2001 | Maes et al. |
| 6,205,249 B1 | 3/2001 | Moskowitz |
| 6,208,745 B1 | 3/2001 | Florencio et al. |
| 6,647,548 B1 * | 11/2003 | Lu et al. .......... 725/20 |

FOREIGN PATENT DOCUMENTS

| | | |
|---|---|---|
| JP | 08/508617 | 9/1996 |
| WO | WO 96/27264 | 9/1996 |
| WO | WO 98/26529 | 6/1998 |
| WO | WO 99/59275 | 11/1999 |
| WO | WO 00/04662 | 1/2000 |
| WO | WO 00/72309 | 11/2000 |
| WO | WO 00/79709 | 12/2000 |
| WO | WO 00/79709 A1 | 12/2000 |

\* cited by examiner

MEDIA DATA USE MEASUREMENT WITH REMOTE DECODING/PATTERN MATCHING

FIELD OF THE INVENTION

The invention relates to systems and methods for identifying and/or measuring usage of media data gathered at a user location using remote decoding and/or pattern matching techniques.

BACKGROUND OF THE INVENTION

Techniques used to determine the programs or other content to which audience members have been exposed are intended to gather such data at the audience members' locations. Various systems have been proposed for this purpose. In one variant, a stationary device is positioned near a television, radio, computer, or the like, in order to monitor media data at audience locations.

Another variant proposes the use of a portable device to be carried about by an audience member in order to gather data regarding the programs and other content to which the audience member has been exposed.

These devices obtain the signals to be monitored either through a direct electrical connection, or by means of a sensor such as a microphone, light-sensitive device, capacitive pickup or magnetic sensor. Typically the device either detects the presence of an ancillary code in the media data or else extracts a signature therefrom for pattern matching, and stores the code or signature for subsequent processing at a remote location. In order to produce audience surveys which are statistically reliable, it is necessary to engage a relatively large number of survey participants, so that it is likewise necessary to supply a relatively large number of monitoring devices, such as stationary or portable devices. It is, therefore, desirable to minimize the complexity of such devices in order to minimize their cost.

SUMMARY OF THE INVENTION

For this application the following terms and definitions shall apply, both for the singular and plural forms of nouns and for all verb tenses:

The term "data" as used herein means any indicia, signals, marks, symbols, domains, symbol sets, representations and any other physical form or forms representing information, whether permanent or temporary, whether visible, audible, acoustic, electric, magnetic, electromagnetic or otherwise manifested.

The term "set" as used herein means any collection of elements, things, or data.

The term "amplitude" as used herein refers to values of energy, power, voltage, current, charge, intensity, size, magnitude, and/or pressure, however measured or evaluated, whether on an absolute or relative basis, on a discrete or continuous basis, on an instantaneous or accumulated basis, or otherwise.

The term "media data" as used herein means data which is widely accessible, whether over-the-air, or via cable, satellite, network, internetwork (including the Internet), distributed on storage media, or otherwise, without regard to the form or content thereof, and including but not limited to audio data and video data.

The terms "coupled", "coupled to" and "coupled with" as used herein each means a relationship between or among two or more devices, apparatus, files, programs, media, components, networks, systems, subsystems and/or means, constituting any one or more of (a) a connection whether direct or through one or more other devices, apparatus, files, programs, media, components, networks, systems, subsystems or means, (b) a communications relationship whether direct or through one or more other devices, apparatus, files, programs, media, components, networks, systems, subsystems, or means, or (c) a functional relationship in which the operation of any one or more thereof depends, in whole or in part, on the operation of any one or more others thereof.

The term "signature" as used herein means a data set derived from the content of media data.

The terms "communicate" and "communication" as used herein include both conveying data from a source to a destination, and delivering data to a communications medium, system or link to be conveyed to a destination.

The term "processor" as used herein data means processing devices, apparatus, programs, circuits, systems and subsystems, whether implemented in hardware, software or both.

In accordance with an aspect of the present invention, a method is provided for measuring usage of media data received at a user location, the media data being reproducible as comprehensible images or comprehensible sounds and having ancillary codes in at least some of the media data. The method comprises receiving the media data in a monitoring device at the user location; forming a data set in the monitoring device from the media data by including in the data set, data sufficient to decode the ancillary codes in the media data or to form a signature to identify the media data, while excluding from the data set, data required either to reproduce the comprehensible images or the comprehensible sounds; communicating the data set to a processing system located remotely from the user location; and at the remotely located processing system, carrying out at least one of (a) detecting the ancillary codes based on the data set; and (b) producing a signature characterizing the media data based on the data set and matching the produced signature with a reference signature associated with identification data for the media data.

In accordance with another aspect of the present invention, a method is provided for measuring the usage of media data received at a user location, the media data being reproducible as comprehensible images or comprehensible sounds and having ancillary codes in at least some of the media data. The method comprises receiving a data set at a processing system located remotely from the user location, the data set including data sufficient to decode the ancillary codes in the media data or to form a signature to identify the media data, while excluding data required either to reproduce the comprehensible images or the comprehensible sounds; and at the remotely located processing system, carrying out at least one (a) detecting the ancillary codes based on the data set; and (b) producing a signature characterizing the media data and matching the produced signature with a reference signature associated with identification data for the media data.

In accordance with still another aspect of the present invention, a system is provided for measuring usage of media data received at a user location, the media data being reproducible as comprehensible images or comprehensible sounds and having ancillary codes in at least some of the media data. The system comprises means for receiving a data set at a processing system located remotely from the user location, the data set including data sufficient to decode the ancillary codes in the media data or to form a signature characterizing the media data, while excluding data required either to reproduce the comprehensible images or the comprehensible sounds; and processing means located at the processing system for carrying out at least one of (a) detecting the ancillary codes based on the data set; and (b) producing a signature characterizing the media data and matching the produced signature with a reference signature associated with identification data for the media data.

In accordance with a further aspect of the present invention, a system is provided for measuring usage of media data received at a user location, the media data being reproducible as comprehensible images or comprehensible sounds and having ancillary codes in at least some of the media data, comprising means for receiving the media data at the user location; means at the user location for forming a data set from the media data by including in the data set, data sufficient to decode the ancillary codes in the media data or to form a signature to identify the media data, while excluding from the data set, data required either to reproduce the comprehensible images or the comprehensible sounds; means for communicating the data set to a processing system located remotely from the user location; and processing means at the processing system for carrying out at least one of (a) detecting the ancillary codes based on the data set; and (b) producing a signature characterizing the media data based on the data set and matching the produced signature with a reference signature associated with identification data for the media data.

In accordance with a yet still further aspect of the present invention, a system is provided for measuring usage of media data received at a user location, the media data being reproducible as comprehensible images or comprehensible sounds and having ancillary codes in at least some of the media data. The system comprises a communications device at a processing facility located remotely from a user location, the communications device having an input to receive a data set including data sufficient to decode the ancillary codes in the media data or to form a signature to identify the media data, while excluding data required to either reproduce the comprehensible images or the comprehensible sounds; and a processor located at the processing facility and coupled with the communications device to receive the data set and operative to carry out at least one of (a) detecting the ancillary codes based on the data set; and (b) producing a signature characterizing the media data based on the data set and matching the produced signature with a reference signature associated with identification data for the media data.

In accordance with still another aspect of the present invention, a system is provided for measuring usage of media data received at a user location, the media data being reproducible as comprehensible images or comprehensible sounds and having ancillary codes in at least some of the media data. The system comprises a monitoring device at the user location and having an input to receive the media data; the first processor at the user location coupled with the monitoring device to receive the media data and operative to form a data set including data sufficient to decode the ancillary codes in the media data or to form a signature to identify the media data, while excluding from the data set, data required either to reproduce the comprehensible images or the comprehensible sounds; a first communications device coupled with the first processor to receive the data set and operative to communicate the data set to a processing system located remotely from the user location; a second communications device at the processing system coupled with the first communications device to receive the data set; and a second processor at the processing system and having an input coupled with the second communications device to receive the data set received by the second communications device, the second processor being operative to carry out at least one of (a) detecting the ancillary codes based on the data set; and (b) producing a signature characterizing the media data based on the data set and matching the produced signature with a reference signature associated with identification data for the media data.

In accordance with a further aspect of the present invention, a method is provided for measuring usage of media data received at a user location. The method comprises receiving media data representing information in a monitoring device at the user location; forming a data set in the monitoring device representing some, but not all, of the information represented by the media data; communicating the data set to a processing system located remotely from the user location; and at the processing system, carrying out at least one of: (a) detecting an ancillary code for the media data based on the data set; and (b) obtaining identification data for the media data by producing a signature for the media data based on the data set and matching the produced signature with a reference signature associated with the identification data.

In accordance with another aspect of the present invention, a method is provided for measuring usage of media data representing information and received at a user location. The method comprises receiving a data set at a processing system located remotely from the user location, the data set representing some, but not all, of the information represented by the media data; and at the processing system, carrying out at least one of: (a) detecting an ancillary code for the media data based on the data set; and (b) obtaining identification data for the media data by producing a signature for the media data based on the data set and matching the produced signature with a reference signature associated with the identification data.

In accordance with a still further aspect of the present invention, a system is provided for measuring usage of media data representing information received at a user location. The system comprises means for receiving a data set at a processing system located remotely from the user location, the data set representing some, but not all, of the information represented by the media data; and processing means located at the processing system, for carrying out at least one of: (a) detecting an ancillary code for the media data based on the data set; and (b) obtaining identification data for the media data by producing a signature for the media data based on the data set and matching the produced signature with a reference signature associated with the identification data.

In accordance with a yet still further aspect of the present invention, a system is provided for measuring usage of media data received at a user location. The system comprises means for receiving media data representing information at the user location; data set forming means at the user location for forming a data set representing some, but not all, of the information represented by the media data; means for communicating the data set to a processing system located remotely from the user location; and processor means at the processing system, for carrying out for at least one of: (a) detecting an ancillary code for the media data based on the data set; and (b) obtaining identification data for the media data by producing a signature for the media data based on the data set and matching the produced signature with a reference signature associated with the identification data.

In accordance with yet another aspect of the present invention, a system is provided for measuring usage of media data representing information received at a user location. The system comprises a communications device at a processing facility located remotely from the user location having an input to receive a data set representing some, but not all, of the information represented by the media data; and a processor located at the processing facility and coupled with the communications device to receive the data set and operative to carry out at least one of: (a) detecting an ancillary code for the media data based on the data set; and (b) obtaining identification data for the media data by producing a signature for the media data based on the data set and matching the produced signature with a reference signature associated with the identification data.

In accordance with yet still another aspect of the present invention, a system is provided for measuring usage of media data received at a user location. The system comprises a monitoring device at the user location and having an input to receive media data representing information; a first processor at the user location coupled with the monitoring device to receive the media data and operative to form a data set representing some, but not all, of the information represented by the media data; a first communications device coupled with the first processor to receive the data set and operative to communicate the data set to a processing system located remotely from the user location; a second communications device at the processing system coupled with the first communications device to receive the data set; and a second processor at the processing system and having an input coupled with the second communications device to receive the data set received by the second communications device, the second processor being operative to carry out at least one of: (a) detecting an ancillary code for the media data based on the data set; and (b) obtaining identification data for the media data by producing a signature for the media data based on the data set and matching the produced signature with a reference signature associated with the identification data.

DETAILED DESCRIPTION OF CERTAIN ADVANTAGEOUS EMBODIMENTS

Figure 1:
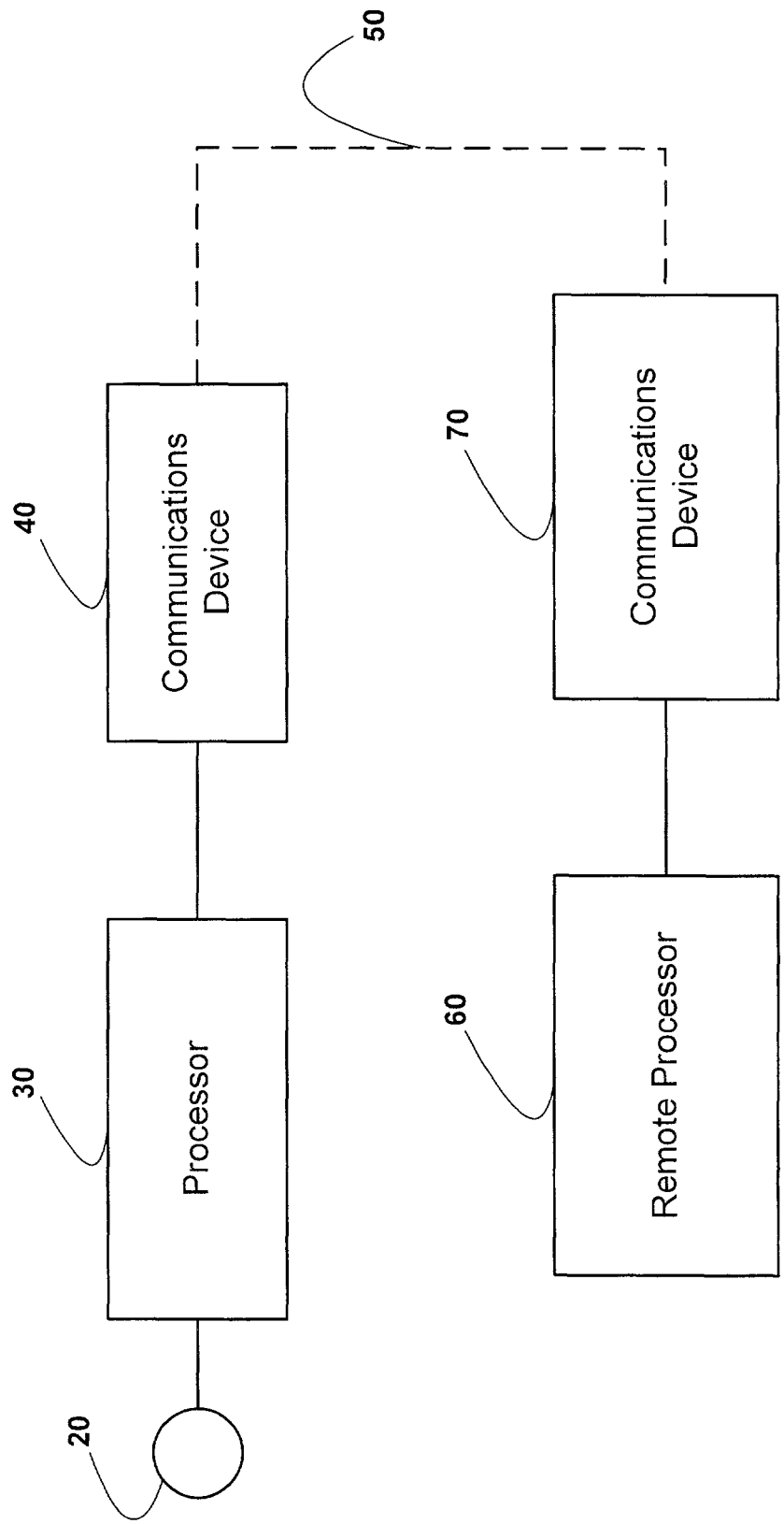
FIG. 1 is a block diagram of an advantageous embodiment of the invention.
Figure 2:
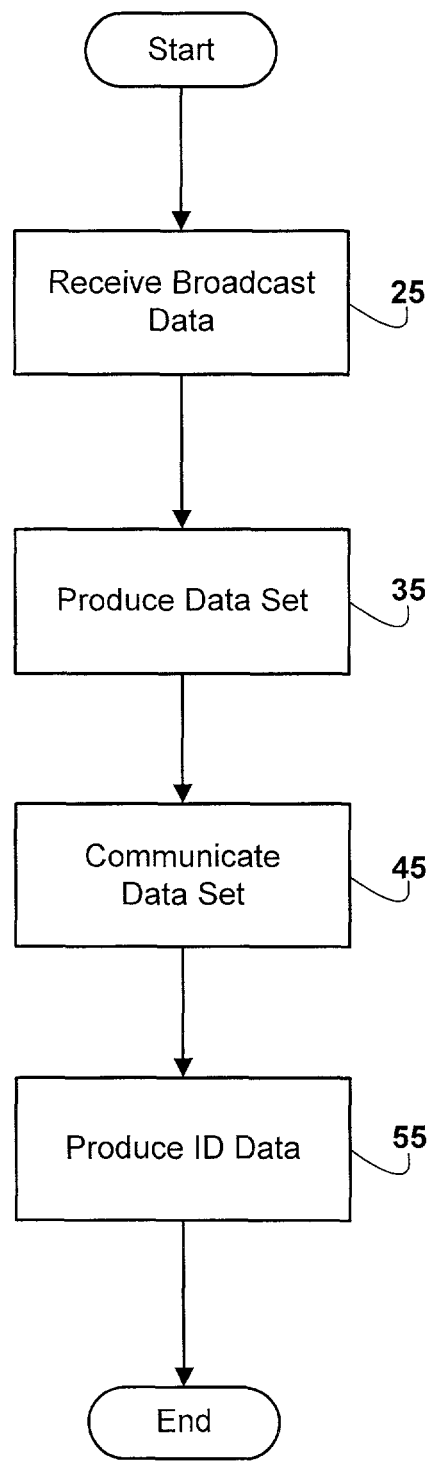
FIG. 2 is a flowchart for use in describing an operation of the FIG. 1 embodiment.

FIG. 1 illustrates an embodiment of a system for measuring usage of media data representing information received at a user location. The system includes a monitoring device 20 at the user location which monitors media data, as indicated by Step 25 in FIG. 2. Where acoustic data including media data, such as audio data, is monitored, the monitoring device 20 typically would be a microphone having an input which receives media data in the form of acoustic energy and which serves to transduce the acoustic energy to electrical data. Where media data in the form of light energy, such as video data, is monitored, the monitoring device 20 takes the form of a light-sensitive device, such as a photodiode, or a video camera. Light energy including media data could be, for example, light emitted by a video display. The device 20 can also take the form of a magnetic pickup for sensing magnetic fields associated with a speaker, a capacitive pickup for sensing electric fields or an antenna for electromagnetic energy. In still other embodiments, the device 20 takes the form of an electrical connection to a monitored device, which may be a television, a radio, a cable converter, a satellite television system, a game playing system, a VCR, a DVD player, a portable player, a computer, a web appliance, or the like. In still further embodiments, the monitoring device 20 is embodied in monitoring software running on a computer or other reproduction system to gather media data.

In certain embodiments, the monitoring device 20 is implemented as a stationary monitoring device positioned near a television, radio, computer, web appliance, a cable converter, a satellite television system, a game playing system, a VCR, a DVD player, or the like. In other embodiments, the monitoring device 20 is implemented as a portable device to be carried about by a user in order to gather data regarding media data to which the user is exposed.

The monitoring device 20 is coupled with an input of a processor 30 at the user location, so that the processor 30 can receive the media data from the monitoring device. The processor 30 is operative to produce a data set representing some, but not all, of the information represented by the media data, as indicated by Step 35 of FIG. 2.

The processor 30 proceeds to form the data set by eliminating portions of the media data which are not required for further processing at a remote location where either a code (such as an ancillary code and/or identification code) is detected from the data set, or a signature is formed for matching against a library of signatures representing known media data, or both of these processes are carried out.

With reference again to Step 35 of FIG. 2, in one advantageous embodiment, the processor 30 transforms the received media data into frequency-domain data and then selects certain portions of the frequency-domain data in order to form the data set. In accordance with certain alternatives of this embodiment, the media data is transformed into frequency-domain data in the form of amplitude data for each of a plurality of frequency ranges. Each of these ranges corresponds to a pre-determined identification code component and/or ancillary code component which may be present in the media data. In certain ones of these embodiments, the amplitude data are formed by producing ratios of amplitude data in certain frequency ranges to noise levels based on amplitude data outside such frequency ranges. In one variant of this technique, the ratios are formed as signal-to-noise ratios.

In still other embodiments, the data set is formed of time-domain data. In certain embodiments, the data set is formed by sub-sampling time-domain data, or by averaging or combining values of such data over time, or by eliminating time segments of the data. In other embodiments, the time-domain data is produced by selecting a portion of such time-domain data from a frequency range narrower than a frequency range of the media data. In some such embodiments, this time-domain data is formed by filtering the media data.

In yet still further embodiments, the data set comprises data representing phase information. Alternative techniques for forming such phase information include comparing the phases of simultaneously occurring components of the media data from different respective frequency ranges or bins, or which constitute one or more single-frequency components, or by comparing time-displaced media data values or through a combination of such techniques.

A communications device 40 is coupled with the processor 30 to receive the data set. The communications device 40 communicates this data set via a communication system, link or medium 50 to a remotely located processing system comprising a further communications device 70 and a remote processor 60, as indicated by Step 45 of FIG. 2. In certain embodiments, the communications device 40 is a modem or network card which transforms the data set into a format appropriate for communication via telephone network, a cable television system, a WAN or a wireless communications system. In embodiments which communicate the data wirelessly, the communications device 40 includes an appropriate transmitter, such as a cellular telephone transmitter, a wireless Internet transmission unit, an optical transmitter, an acoustic transmitter or satellite communications transmitter.

The device 70 is selected as appropriate, to be coupled with the device 40 to receive the data set as communicated thereby via the system, link or medium 50. The communications device 70 is coupled with remote processor 60 to provide the data set thereto for producing identification data, as indicated by Step 55 of FIG. 2.

In certain embodiments, the remote processor 60 processes the data set to detect an identification code for the media data and/or an ancillary code therein, based on the data set. In other embodiments the remote processor 60 carries out a pattern matching process, by producing a signature for the media data based on the data set and matching the produced signature with a reference signature which is made available at the remotely located processing system. In some embodiments the reference signature is obtained from a database maintained at the remotely located processing system, while in others the reference signature is obtained from a remote source, such as a server which accesses a remotely located database.

The reference signature is associated with identification data serving to identify the media data from which the reference signature has been obtained. Accordingly, once a reliable match of the produced signature with a reference signature has been achieved, the identification data associated with the reference signature serves to identify the media data represented by the received data set.

Several advantageous and suitable techniques for detecting identification codes in media data are disclosed in U.S. Pat. No. 5,764,763 to James M. Jensen, et al, which is assigned to the assignee of the present application, and which is incorporated by reference herein. Other appropriate decoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., and U.S. patent application Ser. No. 09/318,045, in the names of Neuhauser, et al., each of which is assigned to the assignee of the present application and all of which are incorporated herein by reference.

Still other suitable decoders are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee, et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al, all of which are incorporated herein by reference.

In certain embodiments, the processor 30 forms the data set of frequency-domain data and the processor 60 processes the frequency-domain data in the data set to detect an identification code or an ancillary code therein. Where the codes have been formed as in the Jensen, et al. U.S. Pat. No. 5,764,763 or U.S. Pat. No. 5,450,490, the frequency-domain data is processed by processor 60 to detect code components with predetermined frequencies. Where the codes have been formed as in the Srinivasan PCT Publication WO 00/04662, the processor 60 processes the frequency-domain data to detect code components distributed according to a frequency-hopping pattern. In certain embodiments, the code components comprise pairs of frequency components modified in amplitude to encode information, and the processor 60 detects such amplitude modifications. In certain other embodiments, the code components comprise pairs of frequency components modified in phase to encode information, and the processor 60 detects such phase modifications. Where the codes have been formed as spread spectrum codes, as in the Aijala, et al. U.S. Pat. No. 5,579,124 or the Preuss, et al. U.S. Pat. No. 5,319,735, the processor 60 comprises an appropriate spread spectrum decoder.

There are advantageous and suitable techniques for carrying out a pattern matching process to identify the media data based on the data set. Several such techniques are described below in connection with FIG. 3.

Other suitable techniques for extracting signatures from media data and matching these signatures to reference signatures are disclosed in U.S. Pat. No. 5,612,729 to Ellis, et al. and in U.S. Pat. No. 4,739,398 to Thomas, et al., each of which is assigned to the assignee of the present invention and both of which are incorporated herein by reference.

Still other suitable techniques are the subject of U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al, U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., and U.S. Pat. No. 4,230,990 to Lert, et al., all of which are incorporated herein by reference.

In accordance with certain advantageous embodiments of the invention, the monitoring device 20 receives media data reproducible as comprehensible images or sounds at a user location, the received media data having ancillary codes therein. The processor 30 serves to form the data set from the media data by excluding data required either to reproduce comprehensible images or comprehensible sounds, while including data sufficient to decode identification codes and/or ancillary codes in the media data or to form a signature to identify such data.

In certain variants of these embodiments, audio or image data picked up by the monitoring device 20 is either transformed to the frequency domain or received as frequency-domain data. Those portions of the frequency-domain data not useful to decode an identification code or an ancillary code for audio or image media data or to form a signature to identify such data, are eliminated. Preferably, but not exclusively, the codes have been added to the audio data in accordance with the inaudible encoding techniques of U.S. Pat. No. 5,764,763. Since the codes themselves are inaudible in the reproduced audio data, audible portions of the audio data may be eliminated from the data set without loss of data required to decode the codes. It will be appreciated that other kinds of inaudible codes may be recovered in this manner.

Similarly, where encoded image data is collected by means of the monitoring device 20, it is preferable that the codes to be recovered are visually imperceptible or minimal. In this manner, the data set may be formed to include data necessary to decode the codes, while eliminating data required to reproduce a comprehensible image. Suitable image encoding techniques for producing encoded images having visually imperceptible or minimal encoding artifacts, and decoding the same are the subject of U.S. Pat. No. 6,122,403 to Rhoads, U.S. Pat. No. 6,208,745 to Florencio, et al., U.S. Pat. No. 6,205,249 to Moskowitz, U.S. Pat. No. 6,198,832 to Maes, et al., U.S. Pat. No. 5,737,025 to Dougherty, et al., and U.S. Pat. No. 5,737,026 to Lu, et al., all of which are incorporated herein by reference.

In other variants, time domain audio or image media data received by the monitoring device is reduced by eliminating such portions which are not useful to decode such an identification code or ancillary code or form such a signature. Such data reduction can be achieved, for example, by filtering or subsampling, averaging or otherwise combining data, or eliminating time segments of the data.

It is thus possible to vastly reduce the amount of data included in the data set, which facilitates storage and communication of the data set. It also preserves the privacy of audience members in the vicinity of the monitoring device 20 by preventing reproduction of comprehensible sounds or images.

Figure 3:
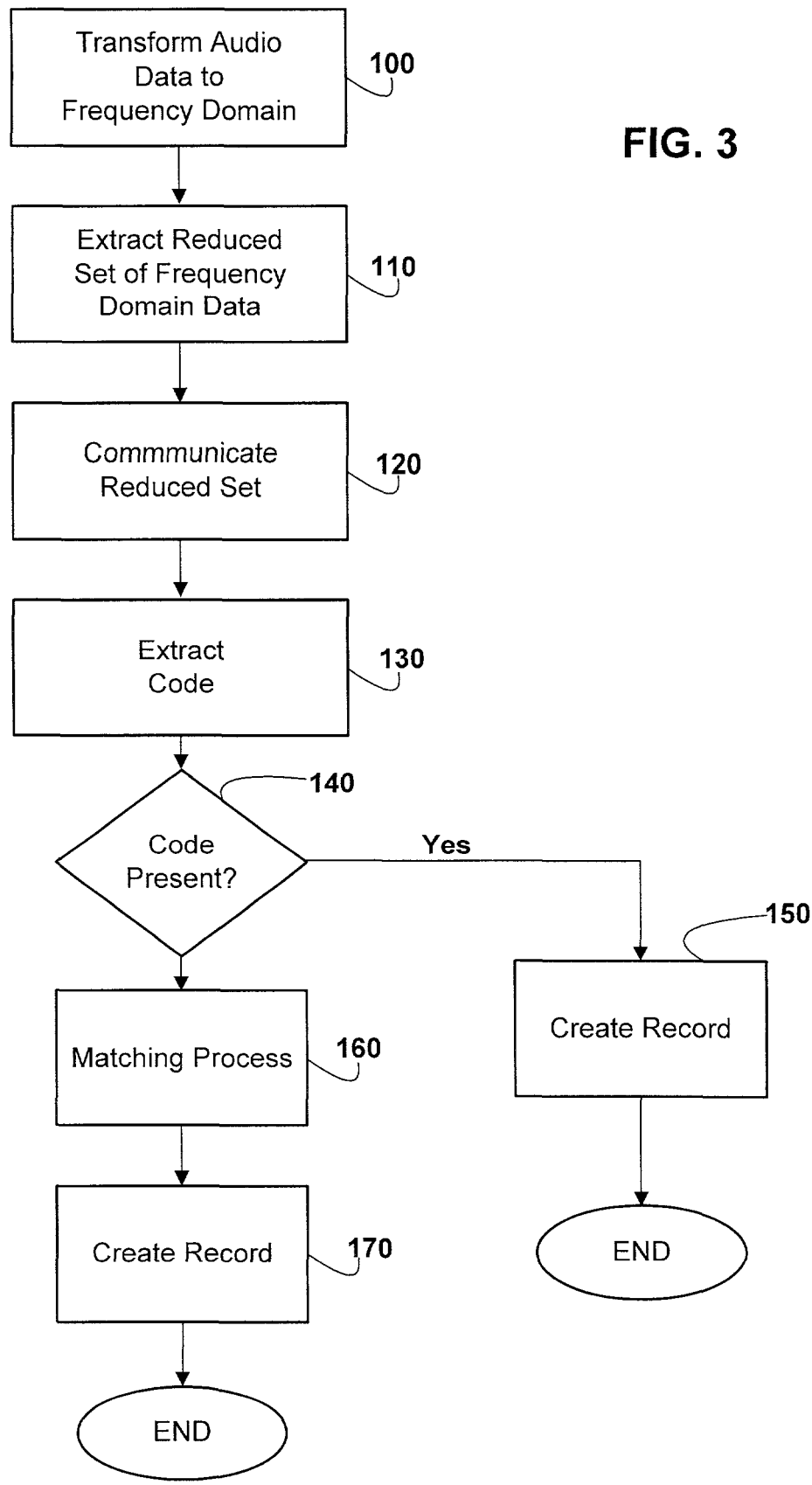
FIG. 3 is a flowchart for use in describing an embodiment of the invention for producing identification data from audio and/or acoustic media data.

FIG. 3 illustrates an advantageous embodiment in which the data set produced at the user location is formed so that, if an identification code and/or ancillary code is present in the media data, it may be extracted from the data set, but that if such a code is not present, the same data set may be used to produce a signature for use in a signature matching process. In Step 100 of FIG. 3, time-domain audio data, such as data obtained from the output of a microphone, is transferred to the frequency domain, by Fast Fourier Transform ("FFT"), wavelet transform, digital filtering, or other time-to-frequency domain transformation. Where the audio data is initially received in the form of frequency-domain data, this step is unnecessary.

The frequency-domain data is subject to a data extraction process in Step 110 to produce a reduced data set, such that data required to detect an identification code and/or ancillary code, if present, is included in the reduced data set, but that a substantial portion of the audio information is not included in the reduced data set. The reduced data set is not merely a compressed version of the audio signal, but also excludes data required to produce a comprehensible version of the audio signal. Consequently, this process not only results in substantial data reduction beyond that which may be achieved in signal compression, but also ensures privacy.

The reduced data set so produced is communicated from the user's location, as indicated by Step 120, to a remotely located processing system. The data set is then subjected to a code detection process 130 carried out by examining the frequency content of the data set. If a code is present, as indicated in Step 140, a record of the code is created in Step 150. In the alternative, or in addition, the detected code is matched with identification data for the media data in a database accessible to the remotely located processing system.

If a code is not detected, a matching process 160 is carried out. In the matching process, a signature is produced based on the data set. There are several alternative signature extraction techniques. In one, the entire data set is used without modification as a signature. In anther, a portion of the data set is selected as a signature. In yet another, a signature is produced based on the data set by combining or otherwise processing its data to produce the signature. In certain ones of such processes, pairs of frequency data are selected from the data set and used to form ratios representing components of the produced signature, as in the audio signature formation technique disclosed in Ellis, et al. U.S. Pat. No. 5,612,729, incorporated herein by reference.

The signature so produced is then compared with reference signatures stored in a database accessible to the remotely located processing system. The matching process may be carried out, for example, in the manner disclosed by Ellis, et al. in U.S. Pat. No. 5,612,729. Once a reliable match is found, a record of the match is created, as indicated in Step 170.

There are a number of suitable techniques for producing the reduced data set in Step 110. Where the audio signal has been encoded in accordance with the Srinivasan PCT Publication WO 00/04662, those frequency components which may include the code components are retained, while those which will not are substantially excluded.

Figure 4:
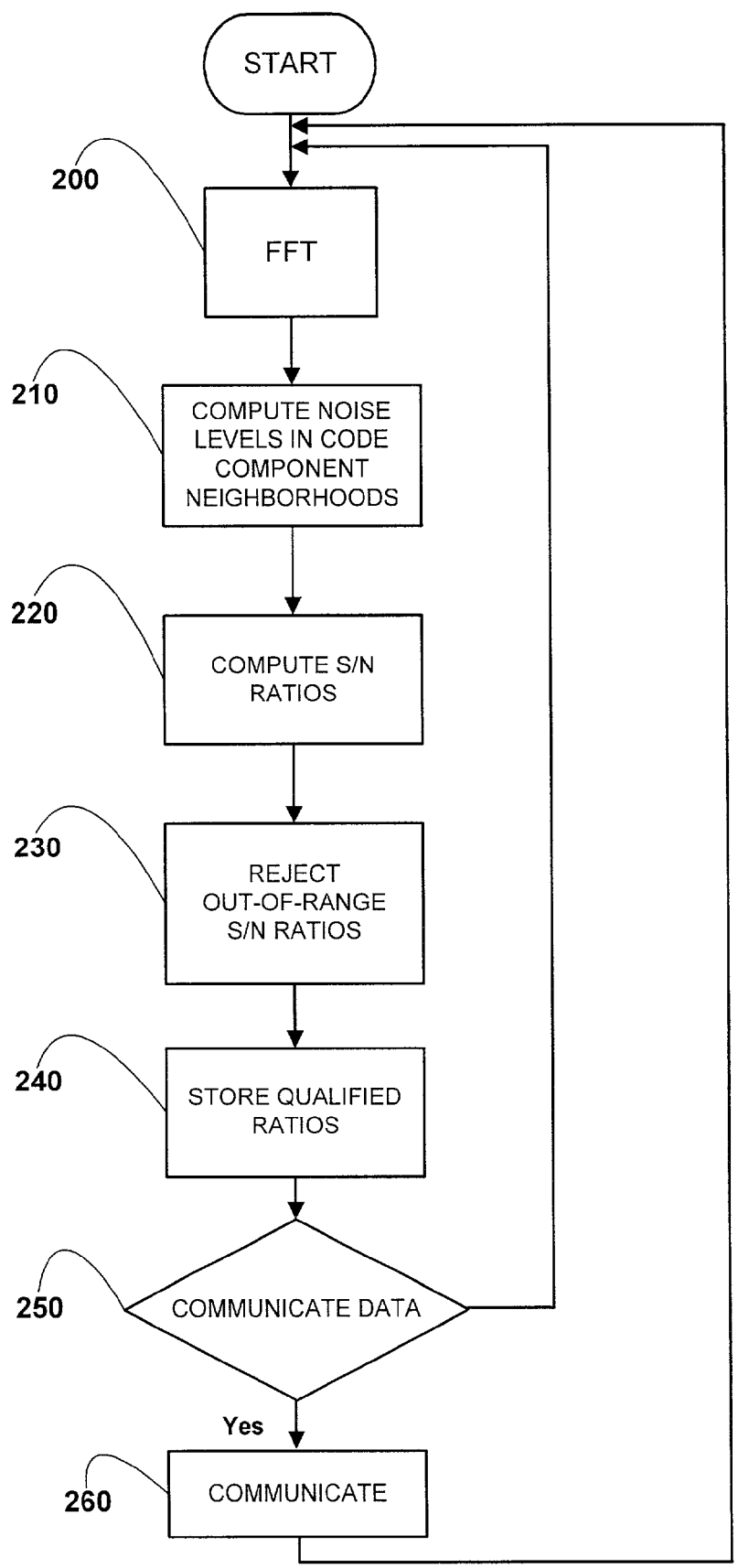
FIG. 4 is a flowchart for use in describing one alternative for implementing the embodiment of FIG. 3.

An advantageous technique for use with audio data encoded as in the Jensen, et al. U.S. Pat. No. 5,764,763 or U.S. Pat. No. 5,450,490 is described in connection with FIG. 4. In the technique of FIG. 4, the audio data if not already in the frequency domain, is transformed thereto by FFT or another suitable method as indicated in Step 200.

Noise amplitudes in the frequency neighborhoods of possible code components are estimated in Step 210. This is achieved by examining the amplitudes of frequency components in such neighborhoods. For example, those components having amplitudes below a threshold, such as an average or mean amplitude or a fixed value, are combined and averaged or otherwise processed to produce a representative noise amplitude.

Then in Step 220 signal-to-noise ratios are determined for each possible code component based on data amplitude at its frequency to the noise amplitude in its frequency neighborhood. In one embodiment, those ratios which exceed an upper threshold are rejected as likely representing non-code audio signal components, and those falling below a lower threshold are rejected as noise. This process is carried out in Step 230. In an alternative embodiment, those ratios which would exceed the upper threshold are nevertheless retained when the data set is formed. In still another embodiment, all ratios are retained, and Step 230 is omitted.

The retained ratios are stored in Step 240 until it is appropriate to communicate the data set to the remotely located processing system. A decision is made to communicate, as indicated in Step 250, when a predetermined criterion is fulfilled. For example, where the data is gathered with a monitoring device carried by an audience member, the data may be communicated while the device is coupled with a base station, as in the Brooks, et al. U.S. Pat. No. 5,483,276. The decision to communicate the data set may instead be determined based on an amount of stored data or on the lapse of time or else upon the establishment of a communication path by the device for transmitting and/or receiving other data. When the criterion for data communication is fulfilled, the stored data set or sets are communicated to the remotely located processing system as indicated in Step 260.

Since it is possible to encode each data symbol with relatively few frequency components in this embodiment, there are relatively few ratios required in order to decode the symbols at the remotely located processing system. This enables the data set to be restricted in size to facilitate its storage and transmission.

Although the invention has been described with reference to certain advantageous embodiments, arrangements of elements or steps, features and the like, these are not intended to exhaust or exclude all or any possible embodiments, arrangements or features, and indeed other modifications and variations will be ascertainable to those of skill in the art.

What is claimed is:

1. A method for measuring usage of media data received at a user location, the media data being reproducible as comprehensible images or comprehensible sounds and having ancillary codes encoded in at least some of the media data, comprising:
   receiving the media data in a monitoring device;
   forming a data set from characteristics derived from the media data received by the monitoring device, wherein the data set:
      (i) is not sufficient to fully decode and detect the ancillary codes in the monitoring device,
      (ii) comprises data usable to sufficiently decode and detect the ancillary codes in the media data remotely from the monitoring device, and
   communicating the data set to a processing system located remotely from the monitoring device; and at the processing system, processing the data set to fully decode and detect the ancillary codes.

2. A method according to claim 1, wherein forming a data set comprises transforming at least a portion of the received media data into frequency-domain data.

3. The method of claim 2, wherein forming a data set comprises producing amplitude data for each of a plurality of frequency ranges of the frequency-domain data, each frequency range corresponding to a predetermined component of the ancillary codes.

4. The method of claim 3, wherein the amplitude data are each formed as a ratio of amplitude data in a corresponding frequency range to a noise level based on amplitude data outside such corresponding frequency range.

5. The method of claim 1, wherein the data set comprises data representing time-domain information.

6. The method of claim 5, wherein the time-domain data comprises data from a frequency range narrower than a frequency range of the media data.

7. The method of claim 1, wherein the data set comprises data representing phase information.

8. The method of claim 1, wherein the media data comprises audio data.

9. The method of claim 1, wherein the media data comprises video data.

10. The method of claim 1, wherein the media data is received as acoustic energy.

11. The method of claim 1, wherein the media data is received as electromagnetic energy.

12. The method of claim 11, wherein the media data is received as light energy.

13. The method of claim 1, wherein the media data is received as magnetic energy.

14. The method of claim 1, wherein the media data is received as electrical energy.

15. The method of claim 1, wherein processing the data set to decode the ancillary codes comprises processing frequency-domain data.

16. The method of claim 15, wherein the frequency-domain data is processed to decode components of the ancillary codes at predetermined frequencies.

17. The method of claim 15, wherein the frequency-domain data is processed to decode code components of the ancillary codes distributed according to a frequency-hopping pattern.

18. The method of claim 17, wherein the code components comprise pairs of frequency components modified in amplitude to encode information.

19. The method of claim 17, wherein the code components comprise pairs of frequency components modified in phase to encode information.

20. The method of claim 1, wherein processing the data set to decode the ancillary codes comprises detecting a spread spectrum code.

21. The method of claim 1, wherein receiving media data comprises receiving media data in a portable monitoring device carryable on the person of a user.

22. The method of claim 1, further comprising:
at the remotely located processing system, producing a signature characterizing the media data and matching the produced signature with a reference signature associated with identification data for the media data.

23. A system for measuring usage of media data received at a user location, the media data being reproducible as comprehensible images or comprehensible sounds and having ancillary codes in at least some of the media data, comprising:

a monitoring device having an input to receive the media data;
a first processor at the user location coupled with the monitoring device to receive the media data and operative to form a data set from characteristics derived from the media data, wherein the data set:
(i) is not sufficient to fully decode and detect the ancillary codes in the monitoring device, and
(ii) comprises data usable to sufficiently decode and detect the ancillary codes in the media data at a processing system located remotely from the user location;
a first communications device coupled with the first processor to receive the data set and operative to communicate the data set to a processing system located remotely from the monitoring device;
a second communications device at the processing system coupled with the first communications device to receive the data set; and
a second processor at the processing system and having an input coupled with the second communications device to receive the data set received by the second communications device, the second processor being operative to process the data set to fully decode and detect the ancillary codes.

24. The system of claim 23, wherein the first processor is operative to form the data set by transforming at least a portion of the received media data into frequency-domain data.

25. The system of claim 24, wherein the processor is operative to produce amplitude data for each of a plurality of frequency ranges of the frequency-domain data, each frequency range corresponding to a predetermined component of the ancillary codes.

26. The system of claim 25, wherein the processor is operative to form each of the amplitude data as a ratio of amplitude data in a corresponding frequency range to a noise level based on amplitude data outside such corresponding frequency range.

27. The system of claim 23, wherein the monitoring device comprises a portable monitoring device carryable on the person of a user.

28. The system of claim 23, wherein the first processor is operative to include time-domain data in the data set.

29. The system of claim 28, wherein the time-domain data comprises data from a frequency range narrower than a frequency range of the media data.

30. The system of claim 23, wherein the first processor is operative to include data representing phase information in the data set.

31. The system of claim 23, wherein the monitoring device is operative to receive the media data as acoustic energy.

32. The system of claim 23, wherein the monitoring device is operative to receive the media data as electromagnetic energy.

33. The system of claim 32, wherein the monitoring device is operative to receive the media data as light energy.

34. The system of claim 23, wherein the monitoring device is operative to receive the media data as magnetic energy.

35. The system of claim 23, wherein the monitoring device is operative to receive the media data as electrical energy.

36. The system of claim 23, wherein the second processor is operative to process the frequency-domain data to decode the ancillary codes.

37. The system of claim 36, wherein the second processor is operative to process the frequency-domain data by detecting components of the ancillary codes at predetermined frequencies to decode the ancillary codes.

38. The system of claim 36, wherein the second processor is operative to process the frequency-domain data to decode code components distributed according to a frequency-hopping pattern.

39. The system of claim 38, wherein the second processor is operative to decode the ancillary codes by detecting pairs of frequency components modified in amplitude to encode information.

40. The system of claim 38, wherein the second processor is operative to decode the ancillary codes by detecting pairs of frequency components modified in phase to encode identification information.

41. The system of claim 23, wherein the second processor is operative to decode the ancillary codes in the form of spread spectrum codes.

42. The system of claim 23, wherein the second processor is further operative to produce a signature characterizing the media data and to match the produced signature with a reference signature associated with identification data for the media data.

43. A system for measuring usage of media data received at a user location, the media data being reproducible as comprehensible images or comprehensible sounds and having ancillary codes in at least some of the media data, comprising:
    a communications device at a processing facility located remotely from a user location, the communications device having an input to receive a data set, the data set being initially processed at the user location such that the data set is derived from the media data and:
        (i) is not sufficient to decode and detect the ancillary codes at the user location, and
        (ii) comprises data usable to sufficiently decode and detect the ancillary codes in the media data in the communications device;
    a processor located at the processing facility and coupled with the communications device to receive the data set and operative to process the data set to fully decode and detect the ancillary codes.

44. The system of claim 43, wherein the processor is operative to decode the ancillary codes by processing frequency-domain data.

45. The system of claim 44, wherein the processor is operative to detect components of the ancillary codes at predetermined frequencies to decode the ancillary codes.

46. The system of claim 44, wherein the processor is operative to decode components of the ancillary codes distributed according to a frequency-hopping pattern.

47. The system of claim 46, wherein the processor is operative to decode pairs of ancillary code frequency components modified in amplitude to encode information.

48. The system of claim 46, wherein the processor is operative to decode pairs of ancillary code frequency components modified in phase to encode information.

49. The system of claim 43, wherein the processor is operative to decode the ancillary codes in the form of spread spectrum codes.

50. The system of claim 43, wherein the processor is further operative to produce a signature characterizing the media data and to match the produced signature with a reference signature associated with identification data for the media data.

51. A system for measuring usage of media data received at a user location, the media data being reproducible as comprehensible images or comprehensible sounds and having ancillary codes in at least some of the media data, comprising:
    means for receiving the media data;
    means for processing the media data to form a data set derived from characteristics of the media data, wherein the data set:
        (i) is not sufficient to fully decode and detect the ancillary codes in the monitoring device, and
        (ii) comprises data usable to sufficiently decode and detect the ancillary codes in the media data at a processing system located remotely from the user location;
    means for communicating the data set to the processing system; and
    processing means at the processing system for processing the data set to fully decode and detect the ancillary codes.

52. The system of claim 51, wherein the means for forming a data set is operative to transform at least a portion of the received media data into frequency-domain data.

53. The system of claim 52, wherein the means for forming a data set is operative to produce amplitude data for each of a plurality of frequency ranges of the frequency-domain data, each frequency range corresponding to a predetermined component of the ancillary codes.

54. The system of claim 53, wherein the means for forming a data set is operative to form each of the amplitude data as a ratio of amplitude data in a corresponding frequency range to a noise level based on amplitude data outside such corresponding frequency range.

55. The system of claim 51, wherein the means for forming the data set is operative to include data representing time-domain information therein.

56. The system of claim 55, wherein the means for forming a data set is operative to select the time-domain data from a frequency range narrower than a frequency range of the media data.

57. The system of claim 51, wherein the means for forming a data set is operative to include data representing phase information therein.

58. The system of claim 51, wherein the means for receiving media data is operative to receive the media data as acoustic energy.

59. The system of claim 51, wherein the means for receiving media data is operative to receive the media data as electromagnetic energy.

60. The system of claim 59, wherein the means for receiving media data is operative to receive the media data as light energy.

61. The system of claim 51, wherein the means for receiving media data is operative to receive the media data as magnetic energy.

62. The system of claim 51, wherein the means for receiving media data is operative to receive the media data as electrical energy.

63. The system of claim 51, wherein the processing means is operative to process frequency-domain data to decode the ancillary codes.

64. The system of claim 63, wherein the processing means is operative to detect components of the ancillary codes at predetermined frequencies to decode the ancillary codes.

65. The system of claim 63, wherein the processing means is operative to detect code components distributed according to a frequency-hopping pattern to decode the ancillary codes.

66. The system of claim 65, wherein the processing means is operative to decode the ancillary codes by detecting pairs of frequency components modified in amplitude to encode information.

67. The system of claim 65, wherein the processing means is operative to decode the ancillary codes by detecting pairs of frequency components modified in phase to encode information.

68. The system of claim 51, wherein the processing means is operative to decode a spread spectrum code as the ancillary code.

69. The system of claim 51, wherein the means for receiving the media data comprises a portable monitoring device carryable on the person of an audience member.

70. The system of claim 51, wherein the processing means is further operative to produce a signature characterizing the media data and to match the produced signature with a reference signature associated with identification data for the media data.

71. A system for measuring usage of media data received at a user location, the media data being reproducible as comprehensible images or comprehensible sounds and having ancillary codes in at least some of the media data, comprising:
  means for receiving a data set at a processing system located remotely from the user location, the data set being initially processed at the user location such that the data set is formed from characteristics derived from the media data and:
    (i) is not sufficient to decode and detect the ancillary codes at the user location, and
    (ii) comprises data usable to sufficiently decode and detect the ancillary codes in the media data in the processing system;
  processing means located at the processing system for processing the data set to fully decode and detect the ancillary codes.

72. The system of claim 71, wherein the processing means comprises means for processing frequency-domain data to decode the ancillary codes.

73. The system of claim 72, wherein the processing means is operative to process the frequency-domain data to decode components of the ancillary codes at predetermined frequencies.

74. The system of claim 72, wherein the processing means is operative to process the frequency-domain data to decode components of the ancillary codes distributed according to a frequency-hopping pattern.

75. The system of claim 74, wherein the processing means is operative to decode pairs of ancillary code frequency components modified in amplitude to encode information.

76. The system of claim 74, wherein the processing means is operative to decode pairs of ancillary code frequency components modified in phase to encode information.

77. The system of claim 71, wherein the processing means is operative to decode the ancillary codes in the form of spread spectrum codes.

78. The system of claim 71, wherein the processing means is further operative to produce a signature characterizing the media data and to match the produced signature with a reference signature associated with identification data for the media data.

79. A method for measuring usage of media data received at a user location, the media data being reproducible as comprehensible images or comprehensible sounds and having ancillary codes in at least some of the media data, comprising:
  receiving a data set at a processing system located remotely from the user location, the data set being initially processed at the user location such that the data set is derived from characteristics of the media data and:
    (i) is not sufficient to fully decode and detect the ancillary codes at the user location, and
    (ii) comprises data usable to sufficiently decode and detect the ancillary codes in the media data in the processing system,
  and at the remotely located processing system, processing the data set to fully decode and detect the ancillary codes.

80. The method of claim 79, wherein processing the data set to decode the ancillary codes comprises processing frequency-domain data.

81. The method of claim 80, wherein the frequency-domain data is processed to decode components of the ancillary codes at predetermined frequencies.

82. The method of claim 80, wherein the frequency-domain data is processed to decode components of the ancillary codes distributed according to a frequency-hopping pattern.

83. The method of claim 82, wherein the code components comprise pairs of frequency components modified in amplitude to encode information.

84. The method of claim 82, wherein the code components comprise pairs of frequency components modified in phase to encode information.

85. The method of claim 79, wherein processing the data set to decode the ancillary codes comprises detecting a spread spectrum code.

86. The method of claim 79, further comprising:
  at the remotely located processing system, producing a signature characterizing the media data and matching the produced signature with a reference signature associated with identification data for the media data.

87. A method for measuring usage of media data received at a user location, comprising:
  receiving media data representing information in a monitoring device at the user location;
  forming a data set from characteristics derived from the media data received by the monitoring device, wherein the data set:
    (i) is not sufficient to decode and detect the ancillary codes in the monitoring device, and
    (ii) comprises data usable to sufficiently decode and detect the ancillary codes in the media data remotely from the monitoring device; and
  at the processing system, processing the data set to decode and detect an ancillary code for the media data.

88. The method of claim 87 wherein forming a data set comprises transforming at least a portion of the received media data into frequency-domain data.

89. The method of claim 88, wherein forming a data set comprises producing amplitude data for each of a plurality of frequency ranges of the frequency-domain data, each frequency range corresponding to a predetermined code component.

90. The method of claim 89, wherein the amplitude data are each formed as a ratio of amplitude data in a corresponding frequency range to a noise level based on amplitude data outside such corresponding frequency range.

91. The method of claim 87, wherein receiving media data comprises receiving media data in a portable monitoring device carryable on the person of a user.

92. The method of claim 87, wherein processing the data set comprises processing frequency-domain data.

93. The method of claim 92, wherein the frequency-domain data is processed to decode components of the identification code at predetermined frequencies.

94. The method of claim 87, further comprising:
  at the processing system, producing a signature characterizing the media data and matching the produced signature with a reference signature associated with identification data for the media data.

95. A method for measuring usage of media data representing information and received at a user location, such media data not having been processed to decode an ancillary code, comprising:
receiving a data set at a processing system located remotely from the user location, the data set being initially processed at the user location such that the data set:
(i) is not sufficient to fully decode and detect the ancillary codes at the user location,
(ii) comprises data usable to sufficiently decode and detect the ancillary codes in the media data in the processing system, and
at the processing system, processing the data set to decode and detect an ancillary code for the media data.

96. The method of claim 95, wherein processing the data set comprises processing frequency-domain data.

97. The method of claim 96, wherein the frequency-domain data is processed to decode components of the identification code at predetermined frequencies.

98. The method of claim 95, further comprising:
at the processing system, producing a signature characterizing the media data and matching the produced signature with a reference signature associated with identification data for the media data.

99. A system for measuring usage of media data representing information received at a user location, such media data not having been processed to decode an ancillary code, comprising:
means for receiving a data set at a processing system located remotely from the user location, the data set being initially processed at the user location such that the data set:
(i) is not sufficient to fully decode and detect the ancillary codes at the user location, and
(ii) comprises data usable to sufficiently decode and detect the ancillary codes in the media data in the processing system, and;
and
processing means located at the processing system for processing the data set to fully decode and detect an ancillary code for the media data.

100. The system of claim 99, wherein the processing means is operative to process frequency-domain data to decode the identification code.

101. The system of claim 100, wherein the processing means is operative to process the frequency-domain data to decode components of the identification code at predetermined frequencies.

102. The system of claim 99, wherein the processing means is further operative to produce a signature characterizing the media data and to match the produced signature with a reference signature associated with identification data for the media data.

103. A system for measuring usage of media data received at a user location, comprising:
means for receiving media data representing information at the user location;
data set forming means at the user location for forming a data set from characteristics derived from the media data, wherein the data set:
(i) is not sufficient to fully decode and detect the ancillary codes at the user location, and
(ii) comprises data usable to sufficiently decode and detect the ancillary codes in the media data remotely;
means for communicating the data set to the processing system located remotely from the user location; and
processor means at the processing system for processing the data set to fully decode and detect an ancillary code for the media data.

104. The system of claim 103, wherein the data set forming means is operative to form the data set by transforming at least a portion of the received media data into frequency-domain data.

105. The system of claim 104, wherein the data set forming means is operative to transform at least a portion of the received media data by producing amplitude data for each of a plurality of frequency ranges of the frequency-domain data, each frequency range corresponding to a predetermined code component.

106. The system of claim 105, wherein the data set forming means is operative to form the amplitude data each as a ratio of amplitude data in a corresponding frequency range to a noise level based on amplitude data outside such corresponding frequency range.

107. The system of claim 106, wherein the means for receiving media data comprises a portable device carryable on the person of a user.

108. The system of claim 103, wherein the processor means is operative to decode the identification code by processing frequency-domain data.

109. The system of claim 108, wherein the processor means is operative to process the frequency-domain data to decode components of the identification code at predetermined frequencies.

110. The system of claim 103, wherein the processing means is further operative to produce a signature characterizing the media data and to match the produced signature with a reference signature associated with identification data for the media data.

111. A system for measuring usage of media data representing information received at a user location, such media data not having been processed to decode an ancillary code, comprising:
a communications device at a processing facility located remotely from the user location having an input to receive a data set, the data set being initially processed in the communications device such that the data set:
(i) is not sufficient to fully decode and detect the ancillary codes in the communications device, and
(ii) comprises data usable to sufficiently decode and detect the ancillary codes in the media data remotely; and
a processor located at the processing facility and coupled with the communications device to receive the data set and operative to process the data set to fully decode and detect an ancillary code for the media data.

112. The system of claim 111, wherein the processor is operative to decode the identification code by processing frequency-domain data.

113. The system of claim 111, wherein the processor is operative to process the frequency-domain data to decode components of the identification code at predetermined frequencies.

114. The system of claim 111, wherein the processor is further operative to produce a signature characterizing the media data and to match the produced signature with a reference signature associated with identification data for the media data.

115. A system for measuring usage of media data received at a user location, comprising:
- a monitoring device at the user location and having an input to receive media data representing information;
- a first processor at the user location coupled with the monitoring device to receive the media data and operative to process the media data at the user location to form a data set from characteristics derived from the media data, wherein the data set:
  - (i) is not sufficient to fully decode and detect the ancillary codes at the user location, and
  - (ii) comprises data usable to sufficiently decode and detect the ancillary codes in the media data at a processing system located remotely from the user location, and
- a first communications device coupled with the first processor to receive the data set and operative to communicate the data set to the processing system located remotely from the user location;
- a second communications device at the processing system coupled with the first communications device to receive the data set; and
- a second processor at the processing system and having an input coupled with the second communications device to receive the data set received by the second communications device, the second processor being operative to process the data set to fully decode and detect an ancillary code for the media data.

116. The system of claim 115, wherein the first processor is operative to form the data set by transforming at least a portion of the received media data into frequency-domain data.

117. The system of claim 116, wherein the first processor is operative to form the data set by producing amplitude data for each of a plurality of frequency ranges of the frequency-domain data, each frequency range corresponding to a predetermined component of the identification code.

118. The system of claim 117, wherein the first processor is operative to form each of the amplitude data as a ratio of amplitude data in a corresponding frequency range to a noise level based on amplitude data outside such corresponding frequency range.

119. The system of claim 115, wherein the monitoring device comprises a portable monitoring device carryable on the person of a user.

120. The system of claim 115, wherein the second processor is operative to decode the identification code by processing frequency-domain data.

121. The system of claim 120, wherein the second processor is operative to process the frequency-domain data to decode components of the identification code at predetermined frequencies.

122. The system of claim 115, wherein the second processor is further operative to produce a signature characterizing the media data and to match the produced signature with a reference signature associated with identification data for the media data.

123. A method for measuring usage of media data received at a user location, the media data being reproducible as comprehensible images or comprehensible sounds, comprising:
- receiving a data set at a processing system located remotely from the user location, wherein the data set is formed from characteristics derived from the media data, and wherein the data set:
  - (i) is not sufficient to fully decode and detect the ancillary codes at the user location,
  - (ii) comprises data usable to sufficiently decode and detect the ancillary codes in the media data remotely, and
- at the remotely located processing system, processing the data set to fully decode and detect the ancillary codes if present in the data set.

124. The method according to claim 123, further comprising:
- receiving the media data in a monitoring device at the user location;
- forming the data set in the monitoring device from the media data; and
- communicating the data set from the user location to the remotely located processing system.

125. The method according to claim 124, wherein forming the data set comprises transforming at least a portion of the received media data into frequency-domain data.

126. The method according to claim 124, wherein the data set comprises data representing time-domain information.

127. The method according to claim 114, wherein the time-domain data comprises, data from a frequency range narrower than a frequency range of the media data.

128. The method according to claim 124, wherein the data set comprises data representing phase information.

129. The method according to claim 124, wherein the media data comprises audio data or video data.

130. The method according to claim 124, wherein the media data is received as acoustic energy, electromagnetic energy, light energy, magnetic energy, or electrical energy.

131. The method according to claim 124, wherein receiving media data comprises receiving media data in a portable monitoring device carryable on the person of a user.

132. The method of claim 123, further comprising:
- at the remotely located processing system, producing a signature characterizing the media data and matching the produced signature with a reference signature associated with identification data for the media data.

133. The method of claim 132, wherein the signature is produced and matched with the reference signature when ancillary codes are not detected in the data set.

134. A system for measuring usage of media data received at a user location, the media data being reproducible as comprehensible images or comprehensible sounds, such media data not having been processed to decode an ancillary code, comprising:
- a processing system located remotely from the user location for receiving a data set, wherein the data set is formed from characteristics derived from the media data, and wherein the data set:
  - (i) is not sufficient to fully decode and detect the ancillary codes at the user location,
  - (ii) comprises data usable to sufficiently decode and detect the ancillary codes in the media data at the processing system located remotely from the user location, and
  - (iii) excludes data required either to reproduce the comprehensible images or the comprehensible sounds;
- and the remotely located processing system operative to process the data set to decode and detect the ancillary codes if present in the data set.

135. The system of claim 134, further comprising:
- a receiver operative to receive the media data at the user location;
- a processor at the user location operative to form the data set from the media data; and a communication device operative to communicate the data set from the user location to the remotely located processing system.

136. The system of claim 135, wherein the processor is operative to transform at least a portion of the received media data into frequency-domain data.

137. The system of claim 135, wherein the processor is operative to form the data set including data representing time-domain information therein.

138. The system of claim 137, wherein the processor is operative to select the time-domain data from a frequency range narrower than a frequency range of the media data.

139. The system of claim 135, wherein the processor is operative to form the data set including data representing phase information therein.

140. The system of claim 135, wherein the receiver is operative to receive the media data as acoustic energy, electromagnetic energy, light energy, magnetic energy, or electrical energy.

141. The system of claim 134, wherein the remotely located processing system is further operative to produce a signature characterizing the media data and to match the produced signature with a reference signature associated with identification data for the media data.

142. The system of claim 141, wherein the signature is produced and matched with the reference signature when ancillary codes are not detected in the data set.

* * * * *

UNITED STATES PATENT AND TRADEMARK OFFICE
CERTIFICATE OF CORRECTION

PATENT NO.        : 8,572,640 B2
APPLICATION NO.   : 09/896246
DATED             : October 29, 2013
INVENTOR(S)       : Ronald S. Kolessar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1504 days.

Signed and Sealed this

Twenty-third Day of May, 2017

Michelle K. Lee
*Director of the United States Patent and Trademark Office*